(12) United States Patent
Yuan et al.

(10) Patent No.: US 12,517,058 B2
(45) Date of Patent: Jan. 6, 2026

(54) INDICATOR RAPIDLY RESPONDING TO SUBTLE pH CHANGE

(71) Applicant: SUZHOU TURING MICROBIAL TECHNOLOGY CO., LTD., Jiangsu (CN)

(72) Inventors: Mengmeng Yuan, Beijing (CN); Lei Zhang, Beijing (CN); Yang Cao, Beijing (CN); Dawei Wang, Beijing (CN); Wei Wu, Beijing (CN)

(73) Assignee: SUZHOU TURING MICROBIAL TECHNOLOGY CO., LTD., Jiangsu (CN)

( * ) Notice: Subject to any disclaimer, the term of this patent is extended or adjusted under 35 U.S.C. 154(b) by 615 days.

(21) Appl. No.: 17/910,733

(22) PCT Filed: Nov. 30, 2021

(86) PCT No.: PCT/CN2021/134257
§ 371 (c)(1),
(2) Date: Sep. 9, 2022

(87) PCT Pub. No.: WO2023/029251
PCT Pub. Date: Mar. 9, 2023

(65) Prior Publication Data
US 2024/0201092 A1    Jun. 20, 2024

(30) Foreign Application Priority Data
Aug. 30, 2021   (CN) .......................... 202111001352.5

(51) Int. Cl.
*B01L 3/00*      (2006.01)
*B01F 33/302*   (2022.01)
(Continued)

(52) U.S. Cl.
CPC ............. *G01N 21/80* (2013.01); *G01N 33/68* (2013.01)

(58) Field of Classification Search
CPC ......... G01N 21/80; G01N 33/68; G01N 33/84
See application file for complete search history.

(56) References Cited

U.S. PATENT DOCUMENTS 3,395,082 A * 7/1968 Mast ........................ C12Q 1/58
                                                          436/163
3,438,737 A * 4/1969 Fader ................. G01N 33/6839
                                                          422/430

(Continued)

FOREIGN PATENT DOCUMENTS

CN   103048315 A   4/2013
CN   105784702 A   7/2016

(Continued)

OTHER PUBLICATIONS

International Search Report (Chinese) and Written Opinion of the International Searching Authority (Chinese) issued in PCT/CN2021/134257, mailed Jun. 2, 2022; ISA/CN.

*Primary Examiner* — Jennifer Wecker
*Assistant Examiner* — Oyeleye Alexander Alabi
(74) *Attorney, Agent, or Firm* — Harness, Dickey & Pierce, P.L.C.

(57) ABSTRACT

The present invention provides an indicator rapidly responding to a subtle pH change, comprising of an acid-base indicator, a stable protein having an isoelectric point of 3.0-10.0 and a molecular weight of 10 kDa-200 kDa, and a buffer solution. The color change interval of the indicator of the present invention can be controlled within a pH range of 0.1-0.2, the color change is obvious, and a solid matrix containing the indicator can be used for rapid detection of pH in different human metabolites.

16 Claims, 2 Drawing Sheets

| | Standard solution pH | 5.6 | 5.8 | 6.0 | 6.2 | 6.4 | 6.8 |
|---|---|---|---|---|---|---|---|
| Nitrazine yellow-lactoferrin sensitive indicator | Filter paper color display | ● | ● | ● | ● | ● | ● |
| | Color | Yellow | Yellow | Yellow | Green | Green | Green |
| | Dust-free cloth color display | ◆ | ◆ | ◆ | ◆ | ◆ | ◆ |
| | Color | Yellow | Yellow | Yellow | Green | Green | Green |

(51) Int. Cl.

| | |
|---|---|
| *B01F 33/3033* | (2022.01) |
| *B01L 7/00* | (2006.01) |
| *B01L 9/00* | (2006.01) |
| *B23D 63/00* | (2006.01) |
| *B29C 37/00* | (2006.01) |
| *B65G 47/80* | (2006.01) |
| *B82Y 20/00* | (2011.01) |
| *B82Y 30/00* | (2011.01) |
| *B82Y 40/00* | (2011.01) |
| *C07K 1/30* | (2006.01) |
| *C12M 1/26* | (2006.01) |
| *C12M 1/34* | (2006.01) |
| *C12M 3/06* | (2006.01) |
| *C12N 1/14* | (2006.01) |
| *C12N 1/20* | (2006.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *C23C 2/00* | (2006.01) |
| *G01N 15/10* | (2024.01) |
| *G01N 15/14* | (2024.01) |
| *G01N 15/1433* | (2024.01) |
| *G01N 21/29* | (2006.01) |
| *G01N 21/41* | (2006.01) |
| *G01N 21/45* | (2006.01) |
| *G01N 21/65* | (2006.01) |
| *G01N 21/80* | (2006.01) |
| *G01N 33/543* | (2006.01) |
| *G01N 33/574* | (2006.01) |
| *G01N 33/58* | (2006.01) |
| *G01N 33/68* | (2006.01) |
| *G01N 35/00* | (2006.01) |
| *G01N 35/02* | (2006.01) |
| *G01N 35/04* | (2006.01) |
| *G01N 35/10* | (2006.01) |
| *G02B 6/42* | (2006.01) |

(56) References Cited

U.S. PATENT DOCUMENTS

| | | | |
|---|---|---|---|
| 5,516,697 A * | 5/1996 | Kruzel | G01N 33/84 |
| | | | 422/420 |
| 2003/0180820 A1* | 9/2003 | Bar-Or | G01N 33/68 |
| | | | 435/7.32 |
| 2012/0042722 A1* | 2/2012 | Song | G01N 33/493 |
| | | | 73/32 R |
| 2013/0102082 A1 | 4/2013 | Majima et al. | |
| 2020/0150048 A1 | 5/2020 | Fei et al. | |

FOREIGN PATENT DOCUMENTS

| | | | | |
|---|---|---|---|---|
| CN | 107827850 A | | 3/2018 | |
| CN | 108120796 A | | 6/2018 | |
| CN | 109043375 A | * | 12/2018 | ......... A23L 13/428 |
| CN | 109060798 A | | 12/2018 | |
| CN | 111896536 A | | 11/2020 | |
| CN | 112625460 A | | 4/2021 | |
| CN | 113702373 A | | 11/2021 | |
| JP | H0534334 A | | 2/1993 | |
| JP | H05196578 A | | 8/1993 | |
| JP | 2005257513 A | | 9/2005 | |

* cited by examiner

| Nitrazine yellow-lactoferrin sensitive indicator | Standard solution pH | 5.6 | 5.8 | 6.0 | 6.2 | 6.4 | 6.8 |
|---|---|---|---|---|---|---|---|
| | Filter paper color display | | | | | | |
| | Color | Yellow | Yellow | Yellow | Green | Green | Green |
| | Dust-free cloth color display | | | | | | |
| | Color | Yellow | Yellow | Yellow | Green | Green | Green |

Fig.1

| Bromocresol green-methyl orange-methyl red-bovine serum albumin indicator | Standard solution pH | 3.4 | 3.6 | 3.7 | 3.8 | 4.0 | 4.2 |
|---|---|---|---|---|---|---|---|
| | Filter paper color display | | | | | | |
| | Color | Red | Red | Reddish brown | Blue purple | Blue | Blue |
| | Dust-free cloth color display | | | | | | |
| | Color | Red | Red | Reddish brown | Blue grey | Blue | Blue |

Fig.2

| | Sample No. | 1 | 2 | 3 | 4 | 5 | 6 |
|---|---|---|---|---|---|---|---|
| Bromocresol green-methyl orange-methyl red-bovine serum albumin indicator | Sample case | Normal | Abnormal | Normal | Normal | Abnormal | Abnormal |
| | pH test paper color display | | | | | | |
| | Sample pH value | 3.8 | 4.8 | 5.2 | 4.2 | 5.4 | 5.2 |
| | Swab color display | | | | | | |
| | Swab color | Yellow | Green | Green | Yellow | Green | Green |

Fig.3

| | Sample No. | 1 | 2 | 3 | 4 | 5 | 6 |
|---|---|---|---|---|---|---|---|
| Nitrazine yellow-lactoferrin sensitive indicator | Sample case | Normal | Abnormal | Abnormal | Normal | Abnormal | Abnormal |
| | pH test paper color display | | | | | | |
| | Sample pH value | 5.6 | 6.8 | 6.8 | 6.2 | 7.0 | 6.6 |
| | Swab color display | | | | | | |
| | Swab color | Yellow | Blue green | Blue green | Yellow | Blue green | Blue green |

Fig.4

INDICATOR RAPIDLY RESPONDING TO SUBTLE pH CHANGE

This application is a U.S. National Phase application under 35 U.S.C. 371 of International Application No. PCT/CN2021/134257, filed on Nov. 30, 2021, which claims the benefit of priority of the Chinese patent application No.: CN 202111001352.5 filed to the China National Intellectual Property Administration on Aug. 30, 2021, with the title of the invention being "Indicator rapidly responding to subtle pH change". The entire disclosures of the above applications are expressly incorporated by reference herein.

FIELD OF THE PRESENT DISCLOSURE

The present application relates to the technical field of biochemistry, and in particular to a color indicator rapidly responding to a subtle pH change and a method for its preparation and use.

BACKGROUND OF THE PRESENT DISCLOSURE

Acid-base indicators are a class of organic compounds, inorganic compounds and combinations thereof that reflect changes in pH through color changes within a specific pH range. The commonly used pH indicators at present include: thymol blue indicator, with color change range pH 1.2-2.8 (red→yellow); bromophenol blue indicator, with color change range pH 2.8-4.6 (yellow→blue green); methyl orange indicator, with color change range pH 3.2-4.4 (red→yellow); Congo red indicator, with color change range pH 3.5-5.2 (blue→red); bromocresol green indicator liquid, with color change range pH 3.6-5.2 (yellow→blue); sodium alizarin sulfonate indicator, with color change range pH 3.7-5.2 (yellow→purple); methyl red indicator, with color change range pH 4.2-6.3 (red→yellow); litmus indicator, with color change range pH 4.2-8.0 (red→blue); bromocresol purple indicator, with color change range pH 5.2-6.8 (yellow→purple); nitrazine yellow indicator, with color change range pH 6.0-7.0 (yellow→blue purple); bromothymol blue indicator, with color change range pH 6.0-7.6 (yellow→blue); neutral red indicator, with color change range pH 6.8-8.0 (red→yellow); cresol red indicator, with color change range pH 7.2-8.8 (yellow→red); curcumin indicator, with color change range pH 7.8-9.2 (yellow→reddish brown); phenolphthalein indicator liquid, with color change range pH 8.3-10.0 (colorless→red); malachite green indicator, with color change range pH 11.0-13.5 (green→colorless), etc.

pH detection is used in various industries. For example, in the medical field, the pH range of human blood is 7.35-7.45. When pH is lower than 7.35, acidosis may occur. When pH is lower than 7.0, severe acidosis may occur leading to coma and death. When the pH of blood is higher than 7.45, alkalosis occurs, and when the pH is higher than 7.8, severe alkalosis may occur leading to tetany and death. In agriculture, the pH of soil is related to the growth of crops. Some crops, such as sesame, rape, radish, etc. can grow in a wider pH range, while others are very sensitive to the pH of soil. For example, tea trees are suitable to grow in soil with a pH of about 4.0-5.5. In wastewater treatment, pH is also an important indicator.

There is a constant search for new indicator components to adjust and optimize the detection range of indicators. Most indicators are originally derived from plants, such as litmus indicators, thymol blue indicators, curcumin indicators, etc. Indicators can be combined to expand or narrow the indication range. For example, a specific proportion of neutral red ethanol solution and thymol blue ethanol solution are mixed together, and the color change range becomes pH 7.0-7.4 (rose→dark green); a specific proportion of bromocresol green indicator and methyl orange indicator is mixed together, and the color change range becomes pH 3.5-4.3 (yellow→blue-green). However, a subspecialty of this field of work does not focus on a pH indicator that indicates a range of pH, but rather indicates a change in pH past a specific pH threshold. For example, Jiangsu Nature Biological Engineering Technology Co. Ltd. (CN105784702A) used curcumin and shikonin mixed in a specific proportion to expand the pH indication range of the acid-base indicator and narrow color change range; Sichuan University (CN111896536A) disclosed a benzothiazole azo compounds acid-base indicator, wherein the pH change range is narrow and the color change is obvious and easy to observe; Taiyuan Yuepeng Electronic Technology Co. Ltd. (CN108120796A) disclosed a determination and calculation method for detecting a change in pH beyond a specific pH threshold of a railway storage battery $CO_3^{2-}$. However, the formulations in the above inventions are based on a simple combination of indicators and changing the ionic environment of the solution in order to obtain a color display similar to the pH change. As an example, in the detection of pH in vaginal secretion samples, the use of a pH indicator limited to a pH range of 4.5-5.0 as displayed by a wide range of colors cannot effectively indicate a specific pH threshold and limits the utility of the indicator for vaginal secretion samples. Instead of indicating a pH within a pH range as represented by a range of colors, it may be more suitable to indicate if the pH of a sample is within or exceeds a pH threshold as represented by an obvious color change. This provides a rapid, sensitive, and easy to interpret pH detection method that may provide more utility in some applications.

SUMMARY OF THE PRESENT DISCLOSURE

The technical problem to be solved by the present invention is to develop an indicator capable of decreasing the color change range interval to allow for rapidly responding to a subtle pH change.

Based on the above-mentioned problems, the technical solution proposed by the present invention is an indicator rapidly responding to a subtle pH change, comprising an acid-base indicator, a protein having an isoelectric point of 3.0-10.0 and a molecular weight of 10 kDa-200 kDa, and a buffer solution.

When the pH of the buffer system, in which the protein is located, is ≠pI of the protein, the protein carries a net charge. The buffer solution is used to change the net charge of the protein based on the pH of the buffer, i.e., the buffer adjusts the net charge of the protein by the pH of the buffer, and adjusts the pH color display interval through a subsequent synergistic effect with the acid-base indicator. Theoretically, the more the pH of the buffer solution in which the protein is located deviates from the pI of the protein, the more the net charge and the greater the solubility of the protein. On the contrary, the less the net charge, the less the solubility of the protein, and solubility is minimized at pH=pI. However, the greater the difference between buffer pH and protein pI, the more the charge will affect ion balance. This makes controlling the color change range increasing difficult and eventually renders the indicator unable to respond to subtle pH changes. Therefore, the isoelectric point range of the selected protein is controlled between 3.0-10.0. Too large or too small a molecular weight of the protein will affect the stability of the protein in the buffer solution, so the molecular weight is limited to 10 kDa-200 kDa so as to ensure its stability.

The protein is one of the following: calmodulin, bovine serum albumin, myosin, collagen, or lactoferrin. The protein is preferably one of the following: bovine serum albumin, myosin, collagen and lactoferrin. The protein is most preferably one of the following: myosin, lactoferrin and collagen.

The acid-base indicator is one of the following: bromocresol green, methyl orange, methyl red, nitrazine yellow, phenolphthalein, bromocresol green-methyl orange, bromocresol green-methyl red, bromocresol green-nitrazine yellow, bromocresol green-phenolphthalein, methyl orange-methyl red, methyl orange-nitrazine yellow, methyl orange-phenolphthalein, methyl red-nitrazine yellow, methyl red-phenolphthalein, nitrazine yellow-phenolphthalein, bromocresol green-methyl orange-methyl red, bromocresol green-methyl orange-nitrazine yellow, bromocresol green-methyl orange-phenolphthalein, bromocresol green-methyl red-nitrazine yellow, bromocresol green-methyl red-phenolphthalein, methyl orange-methyl red-nitrazine yellow, methyl orange-methyl red-phenolphthalein, methyl red-nitrazine yellow-phenolphthalein, bromocresol green-methyl orange-methyl red-nitrazine yellow, bromocresol green-methyl orange-methyl red-phenolphthalein, bromocresol green-methyl red-nitrazine yellow-phenolphthalein, methyl orange-methyl red-nitrazine yellow-phenolphthalein, bromocresol green-methyl orange-methyl red-nitrazine yellow-phenolphthalein. It is preferably is one of the following: bromocresol green, nitrazine yellow, bromocresol green-methyl orange, bromocresol green-nitrazine yellow, methyl orange-methyl red, methyl red-nitrazine yellow, nitrazine yellow-phenolphthalein, bromocresol green-methyl red-nitrazine yellow, bromocresol green-methyl red-phenolphthalein, methyl orange-methyl red-phenolphthalein, methyl red-nitrazine yellow-phenolphthalein, bromocresol green-methyl orange-methyl red-nitrazine yellow, bromocresol green-methyl red-nitrazine yellow-phenolphthalein, methyl orange-methyl red-nitrazine yellow-phenolphthalein or bromocresol green-methyl orange-methyl red-nitrazine yellow-phenolphthalein. It is most preferably one of the following: bromocresol green-nitrazine yellow, methyl orange-methyl red, nitrazine yellow-phenolphthalein, bromocresol green-methyl red-nitrazine yellow, bromocresol green-methyl red-phenolphthalein, bromocresol green-methyl orange-methyl red-nitrazine yellow, methyl orange-methyl red-nitrazine yellow-phenolphthalein, bromocresol green-methyl orange-methyl red-nitrazine yellow-phenolphthalein.

Buffer solutions include the following: citric acid-sodium citrate, citric acid-sodium hydroxide, sodium citrate-hydrochloric acid, sodium dihydrogen phosphate-dipotassium hydrogen phosphate, sodium dihydrogen phosphate-sodium hydroxide, dipotassium hydrogen phosphate-hydrochloric acid, dipotassium hydrogen phosphate-phosphoric acid, acetic acid-sodium acetate, acetic acid-potassium acetate. Preferred buffer solutions are one of the following: citric acid-sodium citrate, citric acid-sodium hydroxide, sodium dihydrogen phosphate-dipotassium hydrogen phosphate, dipotassium hydrogen phosphate-hydrochloric acid, dipotassium hydrogen phosphate-phosphoric acid, acetic acid-sodium acetate, acetic acid-potassium acetate. The most preferred is one of the following: of citric acid-sodium citrate, sodium dihydrogen phosphate-dipotassium hydrogen phosphate, acetic acid-sodium acetate.

A method of preparing the indicator rapidly responding to a subtle pH change, comprising the following steps of:
1) Preparing a protein stock solution with a mass fraction of 0.01% to 0.05% by weighing a specific amount of protein and dissolving in glycerol;
2) Preparing the acid-base indicator with mass percent of 0.05%~0.5% by weighing and dissolving a specific amount of acid-base indicator, and the solvent may be ultrapure water, ethanol, or methanol;
3) Preparing 0.1M buffer solution at different pH, within a pH range of 2.0 to 14.0, by weighing and dissolving a specific amount of each component of buffer solution;
4) Mixing the protein solution obtained in 1) with the acid-base indicator obtained in 2) in a volume ratio of 1:5 to 1:50;
5) Diluting the mixed solution of 4) to volume with the buffer solution obtained in 3).

The indicator is attached to a solid substrate for detection using human metabolites, such as saliva, blood, sweat, urine, semen, amniotic fluid, milk, vaginal mucus, cervical mucus, etc. wherein the solid substrate comprises an indication swab, a test paper, a dust-free cloth, or a cellulose dressing.

Advantages and Benefits of the Invention

The present invention uses a combination of added proteins with different isoelectric points and molecular weights and a matching buffer solution to a conventional indicator to obtain an ultra-sensitive color indicator capable of rapidly responding to a change in pH value, wherein the color change interval of the indicator can be controlled between a narrow pH range of 0.1-0.2 due to the addition of proteins with a specific isoelectric point and molecular weight, and capable of producing an obvious color change, so that pH of different human metabolites can be rapidly detected using a solid matrix containing the indicator.

BRIEF DESCRIPTION OF THE DRAWINGS

FIG. 1 shows a color display of an ultra-sensitive indicator with a change point of pH 6.2.

FIG. 2 shows a color display of an ultra-sensitive indicator with a change point of pH 3.8.

FIG. 3 shows a color display of an ultra-sensitive indication swab for a detection of vaginal mucus.

FIG. 4 shows a color display of an ultra-sensitive indication test paper for a detection of urine.

DESCRIPTION OF THE EMBODIMENTS

The following describes in detail embodiments of the present invention with reference to specific examples.

Example 1 Preparation of an Ultra-Sensitive Indicator with a Color Change Display Point of pH 6.2

Formulation of 0.015% lactoferrin solution: weigh 1.5 mg lactoferrin, dissolve and dilute to volume in 10 mL glycerol; formulation of 0.2% nitrazine yellow indicator: weigh 0.2 g nitrazine yellow, dissolve and dilute to volume in 100 mL anhydrous ethanol; formulation of 0.1 mol/L citric acid solution: weigh 21.01 g citric acid, dissolve and dilute to volume in 1000 mL pure water; formulation of 0.1 mol/L sodium citrate solution: weigh 29.41 g sodium citrate, dissolve and dilute to volume in 1000 mL pure water; mix 19.0 mL citric acid solution and 81.0 mL sodium citrate solution to provide a SSC buffer solution of pH 6.0; mix the above 100 UL lactoferrin solution and 1.5 mL nitrazine yellow solution homogeneously, and dilute to volume in 10 mL with the SSC solution of pH 6.0 to provide the ultra-sensitive indicator with a color change display point of pH 6.2.

As shown in FIG. 1, after the prepared ultra-sensitive indicator with the color change point of pH 6.2 is wetting the filter paper or the dust-free cloth block and dried, the detection solution with different pH is added dropwise. When the pH is ≥6.2, the indicator filter paper or the cloth block change in color from yellow to green.

Example 2 Preparation of an Ultra-Sensitive Indicator with a Color Change Display Point of pH 4.4

Formulation of 0.025% Myosin Solution: weigh 2.5 mg myosin, dissolve and dilute to volume in 100 mL glycerol; formulation of 0.1% bromocresol green-nitrazine yellow indicator: weigh simultaneously 0.02 g bromocresol green and 0.08 g nitrazine yellow reagent, dissolve and dilute to volume in 100 mL anhydrous ethanol; formulation of 0.1 mol/L citric acid solution: weigh 21.01 g citric acid, dissolve and dilute to volume in 1000 ml pure water; formulation of 0.1 mol/L sodium citrate solution: weigh 29.41 g sodium citrate, dissolve and dilute to volume in 1000 mL pure water; mix 65.5 mL citric acid solution and 34.5 mL sodium citrate solution to provide a SSC buffer solution of pH 4.0; mix 50 μL the above-mentioned myosin solution and 2 mL bromocresol green-nitrazine yellow indicator homogeneously, and dilute to volume in 10 mL with a SSC solution of pH 4.0 to provide the ultra-sensitive indicator with a color change display point of pH 4.4.

Example 3 Preparation of an Ultra-Sensitive Indicator with a Color Change Display Point of pH 3.8

Formulation of 0.02% bovine serum albumin solution: weigh 20 mg lactoferrin, dissolve and dilute to volume in 100 mL glycerol; formulation of 0.47% bromocresol green-methyl orange-methyl red indicator: weigh simultaneously 0.25 g bromocresol green, 0.1 g methyl orange and 0.12 g methyl red reagent, dissolve and dilute to volume in 100 mL anhydrous ethanol; formulation of 0.1 mol/L sodium acetate solution: weigh 8.2 g sodium acetate, dissolve and dilute to volume in 1000 mL pure water; formulation of 0.1 mol/L acetic acid solution: 2.86 mL acetic acid solution is diluted with ultrapure water to 500 mL; mix 15.0 mL acetic acid solution and 75.0 mL sodium acetate solution to provide ABS buffer solution of pH 3.5; mix the above 200 μL bovine serum albumin solution and 1.5 mL bromocresol green-methyl orange-methyl red indicator homogeneously, and dilute to volume in 10 mL with ABS solution of pH 3.5 to provide the ultra-sensitive indicator with color change display point of pH 3.8.

As shown in FIG. 2, after the prepared ultra-sensitive indicator with the color change point of pH 3.8 is applied to the filter paper or the dust-free cloth block and dried, the detection solution with different pH is added dropwise. When the pH is ≥3.8, the indicator filter paper or the cloth block change in color from yellow to green.

Example 4 Preparation of an Ultra-Sensitive Indicator with a Color Change Display Point of pH 8.0

Formulation of 0.04% bovine serum albumin solution: weigh 4.0 mg bovine serum albumin, dissolve and dilute to volume in 10 mL glycerol; formulation of 0.48% bromocresol green-methyl red-nitrazine yellow-phenolphthalein indicator: weigh simultaneously 0.1 g bromocresol green, 0.12 g methyl red, 0.16 g nitrazine yellow and 0.1 g phenolphthalein, dissolve and dilute to volume in 100 mL methanol; formulation of 0.1 mol/L sodium dihydrogen phosphate solution: weigh 12.0 g sodium dihydrogen phosphate, dissolve and dilute to volume in 1000 mL pure water; formulation of 0.1 mol/L dipotassium hydrogen phosphate solution: weigh 17.4 g dipotassium hydrogen phosphate, dissolve and dilute to volume in 1000 mL pure water; mix 16 mL sodium dihydrogen phosphate solution and 84.0 mL dipotassium hydrogen phosphate solution to provide a PBS buffer solution of pH 7.5; mix the above-mentioned 30 μL bovine serum albumin solution and 1.0 mL bromocresol green-methyl red-nitrazine yellow-phenolphthalein homogeneously, and dilute to volume in 10 mL with a PBS solution of pH 7.5 to provide the ultra-sensitive indicator with a color change display point of pH 8.0, i.e. when pH of the detection substance is ≥8.0, the solution changes in color from grey to blue purple.

Example 5 Preparation of pH Color Change Display Ultra-Sensitive Indication Swab for Detection of Vaginal Mucus Formulation of 0.025% Myosin Solution: weigh 2.5 mg lactoferrin, dissolve and dilute to volume in 10 mL glycerol; formulation of 0.26% bromocresol green-nitrazine yellow indicator: weigh simultaneously 0.06 g bromocresol green and 0.2 g nitrazine yellow reagent, dissolve and dilute to volume in 100 mL anhydrous ethanol; formulation of 0.1 mol/L citric acid solution: weigh 21.01 g citric acid, dissolve and dilute to volume in 1000 mL pure water; formulation of 0.1 mol/L sodium citrate solution: weigh 29.41 g sodium citrate, dissolve and dilute to volume in 1000 mL pure water; mix 65.5 mL citric acid solution and 34.5 mL sodium citrate solution to provide a SSC buffer solution of pH 4.0; mix 50 μL the above-mentioned myosin solution and 2 mL bromocresol green-nitrazine yellow indicator homogeneously, and dilute to volume in 10 mL with a SSC solution of pH 4.0 to provide the ultra-sensitive indicator with a color change display point of pH 4.6. An ultra-sensitive indication swab for ultra-sensitive detection of vaginal mucus is prepared by adding the ultra-sensitive indicator dropwise onto a sampling swab, allowing it to be completely wet, then placing it in a vacuum drying oven and drying at 30° C. for 1 hour.

The normal pH value of vaginal mucus is 3.8-4.5. A pH value higher than 4.5, is characteristic of abnormal leucorrhea. Sample a vaginal secretion sample with the indication swab for ultra-sensitive detection of vaginal mucus. If the swab does not change color and is still yellow, it indicates that the pH of the secretion is normal; if the color changes to green, it indicates that the pH of secretion is abnormal. As shown in FIG. 3, drop different vaginal mucus samples on pH test paper and ultra-sensitive indication swab respectively and judge the actual pH value according to the pH test paper, wherein the swab with pH≤4.6 is yellow in color, and the swab with pH≥4.6 is green in color.

Example 6 Preparation of pH Color Change Display Ultra-Sensitive Test Paper for Detection of Urine Formulation of 0.015% lactoferrin solution: weigh 1.5 mg lactoferrin, dissolve and dilute to volume in 10 mL glycerol; formulation of 0.2% nitrazine yellow-phenolphthalein indicator: weigh 0.12 g nitrazine yellow indicator and 0.08 g phenolphthalein, dissolve and dilute to volume in 100 mL anhydrous ethanol; formulation of 0.1 mol/L citric acid solution: weigh 21.01 g citric acid, dissolve and dilute to volume in 1000 mL pure water; formulation of 0.1 mol/L sodium citrate solution: weigh 29.41 g sodium citrate, dissolve and dilute to volume in 1000 mL pure water; mix 19.0 mL citric acid solution and 81.0 mL sodium citrate solution to provide a SSC buffer solution of pH 6.0; mix the above 280 UL lactoferrin solution and 1.5 mL nitrazine yellow-phenolphthalein indicator solution homogeneously, and dilute to volume in 10 mL with a SSC solution of pH 6.0 to obtain the ultra-sensitive indicator with a color change display point of pH 6.5.

If the ultra-sensitive indicator is added dropwise on the filter paper, after it is completely wet, it is placed in a vacuum drying oven to dry at 30° C. for 20 min to produce the ultra-sensitive test paper for detecting urine.

The normal pH value of urine is 5.5-6.5. When the pH value is higher than 6.5, it is one of the early warning signs of abnormal conditions. Sample urine with the ultra-sensitive test paper for detecting urine. If the test paper does not change color and is still yellow, it indicates that the urine pH is normal; if the test paper changes color to blue green, it indicates that the urine pH is abnormal. As shown in FIG. 4, different urine samples are added dropwise on pH test paper and ultra-sensitive test paper respectively and the actual pH value is determined according to the pH test paper, wherein the swab with pH≤6.5 is yellow in color, and the swab with pH>6.5 is blue green in color.

Example 7 Preparation of pH Color Change Display Ultra-Sensitive Test Paper for Detection of Semen Formulation of 0.04% bovine serum albumin solution: weigh 4.0 mg bovine serum albumin, dissolve and dilute to volume in 10 mL glycerol; formulation of 0.48% bromocresol green-methyl red-nitrazine yellow-phenolphthalein indicator: weigh simultaneously 0.1 g bromocresol green, 0.12 g methyl red, 0.16 g nitrazine yellow and 0.1 g phenolphthalein, dissolve and dilute to volume in 100 mL methanol; formulation of 0.1 mol/L sodium dihydrogen phosphate solution: weigh 12.0 g sodium dihydrogen phosphate, dissolve and dilute to volume in 1000 mL pure water; formulation of 0.1 mol/L dipotassium hydrogen phosphate solution: weigh 17.4 g dipotassium hydrogen phosphate, dissolve and dilute to volume in 1000 mL pure water; mix 16 mL sodium dihydrogen phosphate solution and 84.0 mL dipotassium hydrogen phosphate solution to provide a PBS buffer solution of pH 7.5; mix the above-mentioned 30 µL bovine serum albumin solution and 1.0 mL bromocresol green-methyl red-nitrazine yellow-phenolphthalein homogeneously, and dilute to volume in 10 mL with a PBS solution of pH 7.5 to provide the ultra-sensitive indicator with a color change display point of pH 8.0.

The ultra-sensitive indicator is added dropwise on the water absorption test paper. After the water absorption test paper is completely wet, it is placed in a vacuum drying oven to dry at 30° C. for 20 min to produce the ultra-sensitive test paper for detecting semen.

The normal pH value of semen is 7.2 to 7.8. When the pH value is higher than 8.0, inflammation may occur. Sample the semen with the ultra-sensitive semen detection test paper. If the test paper does not change color and is still gray, it indicates that the pH of semen is normal; if the test paper changes color to blue purple, it indicates that the pH of semen is high.

Example 8 Preparation of an Ultra-Sensitive Wound Acid Dressing for pH Indication on the Skin Surface Ultra-sensitive color indicators are mixed with cellulose dressings and used as wound healing indicators in the following formula:

Formulation of 0.025% collagen solution: weigh 2.5 mg collagen, dissolve and dilute to volume in 10 mL glycerol; formulation of 0.13% nitrazine yellow-phenolphthalein indicator: weigh simultaneously 0.05 g nitrazine yellow and 0.08 g phenolphthalein reagent, dissolve and dilute to volume in 100 mL sterile water; formulation of 0.1 mol/L citric acid solution: weigh 21.01 g citric acid, dissolve and dilute to volume in 1000 ml pure water; mix 27.5 mL citric acid solution and 72.5 mL sodium citrate solution to provide a SSC buffer solution of pH 5.5; mix the above-mentioned 50 µL collagen solution and 2 mL nitrazine yellow-phenolphthalein indicator homogeneously, and dilute to volume in 10 mL with use a SSC solution of pH 5.5 to produce the ultra-sensitive indicator with a color change display point of pH 6.5.

1 mL ultra-sensitive indicator is mixed with a piece of cellulose dressing, and is placed in a vacuum drying oven to dry at 25° C. for 10 min after it has penetrated evenly to produce ultra-sensitive wound acid dressing.

Normal skin pH ranges from 4.0 to 6.0, and chronic wound pH ranges from 6.5 to 8.5. When this acid dressing is applied on the skin wound of a patient, the dressing is light blue; when the wound has healed, the dressing may appear colorless or pale yellow.

While several embodiments of the invention have been described in detail, the description is merely a preferred embodiment of the invention and is not to be construed as limiting the scope of the invention. All equivalent changes and modifications made within the scope of the present invention shall fall within the scope of the present invention.

What is claimed is:

1. An indicator rapidly responding to a subtle pH change, characterized by comprising an acid-base indicator, a stable protein with isoelectric point of 3.0-10.0 and a molecular weight of 10 kDa-200 kDa, and a buffer solution, wherein the stable protein being one of calmodulin, myosin, collagen, or lactoferrin, and wherein the acid-base indicator is one of methyl orange, methyl red, nitrazine yellow, phenolphthalein, bromocresol green-methyl orange, bromocresol green-methyl red, bromocresol green-nitrazine yellow, bromocresol green-phenolphthalein, methyl orange-methyl red, methyl orange-nitrazine yellow, methyl orange-phenolphthalein, methyl red-nitrazine yellow, methyl red-phenolphthalein, nitrazine yellow-phenolphthalein, bromocresol green-methyl orange-methyl red, bromocresol green-methyl orange-nitrazine yellow, bromocresol green-methyl orange-phenolphthalein, bromocresol green-methyl red-nitrazine yellow, bromocresol green-methyl red-phenolphthalein, methyl orange-methyl red-nitrazine yellow, methyl orange-methyl red-phenolphthalein, methyl red-nitrazine yellow-phenolphthalein, bromocresol green-methyl orange-methyl red-nitrazine yellow, bromocresol green-methyl orange-methyl red-phenolphthalein, bromocresol green-methyl red-nitrazine yellow-phenolphthalein, methyl orange-methyl red-nitrazine yellow-phenolphthalein, or bromocresol green-methyl orange-methyl red-nitrazine yellow-phenolphthalein.

2. The indicator rapidly responding to a subtle pH change of claim 1, characterized by the buffer solution including one of the following compounds: citric acid-sodium citrate, citric acid-sodium hydroxide, sodium citrate-hydrochloric acid, sodium dihydrogen phosphate-dipotassium hydrogen phosphate, sodium dihydrogen phosphate-sodium hydroxide, dipotassium hydrogen phosphate-hydrochloric acid, dipotassium hydrogen phosphate-phosphoric acid, acetic acid-sodium acetate or acetic acid-potassium acetate.

3. The indicator rapidly responding to a subtle pH change of claim 1, characterized by the acid-base indicator rapidly responding to a subtle pH change being one of a color change display point of pH 6.2, a color change display point of pH 4.4, a color change display point of pH 3.8, a color change display point of pH 8.0, a color change display point of pH 4.6, or pH 6.5.

4. The indicator rapidly responding to a subtle pH change of claim 3, characterized in that
when the color change display point is pH 6.2, the acid-base indicator is nitrazine yellow, the stable protein is lactoferrin, and the buffer solution is citric acid-sodium citrate;
when the color change display point is pH 4.4, the acid-base indicator is bromocresol green-nitrazine yellow, the stable protein is myosin, and the buffer solution is citric acid-sodium citrate;
when the color change display point is pH 3.8, the acid-base indicator is bromocresol green-methyl orange-methyl red, the stable protein is bovine serum albumin, and the buffer solution is acetic acid-sodium acetate;
when the color change display point is pH 8.0, the acid-base indicator is bromocresol green-methyl red-nitrazine yellow-phenolphthalein, the stable protein is bovine serum albumin, and the buffer solution is sodium dihydrogen phosphate-dipotassium hydrogen phosphate;
when the color change display point is pH 4.6, the acid-base indicator is bromocresol green-nitrazine yellow, the stable protein is lactoferrin, and the buffer solution is citric acid-sodium citrate;
when the color change display point is pH 6.5, the acid-base indicator is nitrazine yellow-phenolphthalein, the stable protein is lactoferrin, and the buffer solution is citric acid-sodium citrate.

5. A method of preparing the indicator rapidly responding to a subtle pH change of claim 1, characterized by comprising the following steps of:
1) Preparing a protein stock solution with a mass percent of 0.01% to 0.05% by weighing a specific amount of protein and dissolving in glycerol;
2) Preparing the acid-base indicator with mass percent of 0.05% to 0.5% by weighing and dissolving a specific amount of acid-base indicator;
3) Preparing 0.1M buffer solutions with differing pH, within pH being 2.0 to 14.0, by weighing and dissolving a specific amount of each component of buffer solution;
4) Mixing the protein solution obtained in 1) with the acid-base indicator obtained in 2) in a volume ratio of 1:5 to 1:50;
5) Diluting the mixed solution of 4) to volume with the buffer solution obtained in 3).

6. Use of an indicator rapidly responding to a subtle pH change in the detection of pH of human metabolites, characterized by the indicator rapidly responding to a subtle pH change being an indicator of claim 1.

7. Use of the indicator rapidly responding to a subtle pH change of claim 6 in the detection of pH of human metabolites, characterized by the human metabolite being vaginal mucus, urine, or semen.

8. Use of the indicator rapidly responding to a subtle pH change of claim 7 in the detection of pH of human metabolites, characterized by the indicator rapidly responding to a subtle pH change being attached to a solid substrate for detecting pH of human metabolites, wherein the solid substrate comprises an indication swab, a test paper, or a cellulose dressing.

9. A method of preparing an indicator rapidly responding to a subtle pH change, characterized by comprising an acid-base indicator, a stable protein with isoelectric point of 3.0-10.0 and a molecular weight of 10 kDa-200 kDa, and a buffer solution, wherein the stable protein is bovine serum albumin, comprising the following steps of:
1) Preparing a protein stock solution with a mass percent of 0.01% to 0.05% by weighing a specific amount of protein and dissolving in glycerol;
2) Preparing the acid-base indicator with mass percent of 0.05% to 0.5% by weighing and dissolving a specific amount of acid-base indicator;
3) Preparing 0.1M buffer solutions with differing pH, within pH being 2.0 to 14.0, by weighing and dissolving a specific amount of each component of buffer solution;
4) Mixing the protein solution obtained in 1) with the acid-base indicator obtained in 2) in a volume ratio of 1:5 to 1:50;
5) Diluting the mixed solution of 4) to volume with the buffer solution obtained in 3).

10. The method of preparing the indicator rapidly responding to a subtle pH change of claim 9, characterized by the buffer solution including one of the following compounds: citric acid-sodium citrate, citric acid-sodium hydroxide, sodium citrate-hydrochloric acid, sodium dihydrogen phosphate-dipotassium hydrogen phosphate, sodium dihydrogen phosphate-sodium hydroxide, dipotassium hydrogen phosphate-hydrochloric acid, dipotassium hydrogen phosphate-phosphoric acid, acetic acid-sodium acetate or acetic acid-potassium acetate.

11. The method of preparing the indicator rapidly responding to a subtle pH change of claim 9, characterized by the acid-base indicator rapidly responding to a subtle pH change being one of a color change display point of pH 6.2, a color change display point of pH 4.4, a color change display point of pH 3.8, a color change display point of pH 8.0, a color change display point of pH 4.6, or pH 6.5.

12. The method of preparing the indicator rapidly responding to a subtle pH change of claim 11, characterized in that
when the color change display point is pH 6.2, the acid-base indicator is nitrazine yellow, the stable protein is lactoferrin, and the buffer solution is citric acid-sodium citrate;
when the color change display point is pH 4.4, the acid-base indicator is bromocresol green-nitrazine yellow, the stable protein is myosin, and the buffer solution is citric acid-sodium citrate;
when the color change display point is pH 3.8, the acid-base indicator is bromocresol green-methyl orange-methyl red, the stable protein is bovine serum albumin, and the buffer solution is acetic acid-sodium acetate;

when the color change display point is pH 8.0, the acid-base indicator is bromocresol green-methyl red-nitrazine yellow-phenolphthalein, the stable protein is bovine serum albumin, and the buffer solution is sodium dihydrogen phosphate-dipotassium hydrogen phosphate;

when the color change display point is pH 4.6, the acid-base indicator is bromocresol green-nitrazine yellow, the stable protein is lactoferrin, and the buffer solution is citric acid-sodium citrate;

when the color change display point is pH 6.5, the acid-base indicator is nitrazine yellow-phenolphthalein, the stable protein is lactoferrin, and the buffer solution is citric acid-sodium citrate.

13. The method of preparing the indicator rapidly responding to a subtle pH change of claim 9, and wherein the acid-base indicator is one of methyl orange, methyl red, nitrazine yellow, phenolphthalein, bromocresol green-methyl orange, bromocresol green-methyl red, bromocresol green-nitrazine yellow, bromocresol green-phenolphthalein, methyl orange-methyl red, methyl orange-nitrazine yellow, methyl orange-phenolphthalein, methyl red-nitrazine yellow, methyl red-phenolphthalein, nitrazine yellow-phenolphthalein, bromocresol green-methyl orange-methyl red, bromocresol green-methyl orange-nitrazine yellow, bromocresol green-methyl orange-phenolphthalein, bromocresol green-methyl red-nitrazine yellow, bromocresol green-methyl red-phenolphthalein, methyl orange-methyl red-nitrazine yellow, methyl orange-methyl red-phenolphthalein, methyl red-nitrazine yellow-phenolphthalein, bromocresol green-methyl orange-methyl red-nitrazine yellow, bromocresol green-methyl orange-methyl red-phenolphthalein, bromocresol green-methyl red-nitrazine yellow-phenolphthalein, methyl orange-methyl red-nitrazine yellow-phenolphthalein, or bromocresol green-methyl orange-methyl red-nitrazine yellow-phenolphthalein.

14. Use of an indicator rapidly responding to a subtle pH change in the detection of pH of human metabolites, characterized by the indicator rapidly responding to a subtle pH change being an indicator of claim 9.

15. Use of the indicator rapidly responding to a subtle pH change of claim 14 in the detection of pH of human metabolites, characterized by the human metabolite being vaginal mucus, urine, or semen.

16. Use of the indicator rapidly responding to a subtle pH change of claim 15 in the detection of pH of human metabolites, characterized by the indicator rapidly responding to a subtle pH change being attached to a solid substrate for detecting pH of human metabolites, wherein the solid substrate comprises an indication swab, a test paper, or a cellulose dressing.

* * * * *